US008672246B2

United States Patent
Lee et al.

(10) Patent No.: US 8,672,246 B2
(45) Date of Patent: Mar. 18, 2014

(54) METHOD FOR PURIFYING GRAPHENE POWDER

(75) Inventors: Jae Kap Lee, Seoul (KR); Kyoung-Il Lee, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 272 days.

(21) Appl. No.: 13/211,609

(22) Filed: Aug. 17, 2011

(65) Prior Publication Data
US 2012/0043402 A1 Feb. 23, 2012

(30) Foreign Application Priority Data
Aug. 18, 2010 (KR) .................. 10-2010-0079964

(51) Int. Cl.
*B02C 19/00* (2006.01)
(52) U.S. Cl.
USPC ........................................ 241/21; 241/24.14
(58) Field of Classification Search
USPC .......................................... 241/30, 21, 24.14
See application file for complete search history.

(56) References Cited

U.S. PATENT DOCUMENTS
2010/0297502 A1* 11/2010 Zhu et al. .................. 429/231.8

FOREIGN PATENT DOCUMENTS
JP 08-198611 A 8/1996
KR 20100023638 A 3/2010

* cited by examiner

*Primary Examiner* — Mark Rosenbaum
(74) *Attorney, Agent, or Firm* — Ladas & Parry LLP

(57) ABSTRACT

An easy and effective method for purifying graphene powder by removing magnetic impurities, wherein magnetic impurities are incorporated during the process of fabricating the graphene powder, is provided. The method for purifying graphene powder, the method including: (1) ball-milling a graphite material to form graphene powder; (2) dispersing the graphene powder in a solvent to form a suspension; and (3) separating magnetic impurities during stirring the suspension, by using a magnet, Wherein the magnetic impurities were incorporated into the graphene powder during ball-milling from the balls and dispersed in the suspension.

9 Claims, 3 Drawing Sheets

METHOD FOR PURIFYING GRAPHENE POWDER

CROSS-REFERENCE TO RELATED APPLICATION

This application claims the benefit of Korean Patent Application No. 10-2010-0079964, filed on Aug. 18, 2010, which is hereby incorporated by reference for all purposes as if fully set forth herein.

FIELD OF THE INVENTION

The present invention relates to a method for purifying graphene powder easily and effectively, removing the magnetic impurities incorporated into the graphene powder.

DESCRIPTION OF THE RELATED ART

Graphene, which is a two-dimensional net that appears morphologically as a layer of honeycombed $sp^2$ carbon having a thickness of about 0.4 nm, is a basic unit of C60, carbon-nano tube (CNT), and graphite.

In case of graphite, a typical layered material, the pi ($\pi$) bonds (van der Waals bonds) between graphene layers are weak while the sigma (covalent) bonds between carbon atoms within each graphene layer are very storing. Due to such unique characteristics, free-standing graphene, namely, graphene in which each graphene layer exists independently, can be fabricated from graphite through a physical method, such as an attrition. Graphene is also a basic unit of CNT, of which physical properties are reported to be eminent compared with any other nanomaterials, and this is the reason why graphene with an atomic thickness is named as a post-CNT material.

Graphene powders (or ribbons) can be fabricated by a mechanical approach, ball-milling graphite in the form of particle. In this case, however, a problem arises in that a great amount of impurities with the size of nano or micron abraded from balls used is included into the graphene sample. For example, when ball-milling using steel balls is performed for about six hours, iron-based components of about 40 wt % over the weight of a raw material is incorporated. The iron component has magnetism, so it may be anticipated that the magnetic impurities can be removed from the ball-milled sample by the conventional method using a magnet. However, the conventional method is not adoptable in the case of the graphene powder which is atomically thin and relatively light compared with the iron-based (magnetic) impurities. The entirety of the graphene powder sticks along with the iron-based nano-particles to the magnet (See FIGS. 1 and 3(a)). This indicates that the previous conventional method is not useful for purifying graphene powers fabricated by ball-milling. Similar problem also arises, to a greater or lesser degree, in the case of purification by a centrifugation (a method of separating and purifying molecules, particles, or the like, dispersed in a solvent by using a centrifugal separator based on a difference in weight between a solvent and a dispersing element or between dispersing elements).

SUMMARY OF THE INVENTION

An aspect of the present invention provides a method for purifying graphene powder easily and effectively by removing magnetic impurities incorporated during the process of fabricating the graphene powder According to an aspect of the present invention, it is provided that a method for purifying graphene powder, including: (1) ball-milling a graphite material to form graphene powder; (2) dispersing the graphene powder in a solvent to form a suspension; and (3) separating magnetic impurities during stirring the suspension, by using a magnet, Wherein the magnetic impurities were incorporated into the graphene powder during ball-milling from the balls and dispersed in the suspension.

Also, in the method for purifying graphene powder according to an embodiment of the present invention, after performing step (3), step (3) could be repeatedly performed on a remaining suspension from which magnetic impurities were separated.

The graphite material could be in the form of a helix.

The ball-milling could be performed to make the graphene powder to have a size of 100 nm or smaller.

The solvent could be any one selected in the group consisted of alcohol, acetone, DMF (dimethylformamide), and toluene.

The dispersing in step (2), the stirring in step (3), or the dispersing and the stirring in step (2) and step (3) could be performed by using ultrasonication The foregoing and other objects, features, aspects and advantages of the present invention will become more apparent from the following detailed description of the present invention when taken in conjunction with the accompanying drawings.

DETAILED DESCRIPTION OF THE INVENTION

A method for purifying graphene powder according to embodiments of the present invention includes (1) ball-milling a graphite material to form graphene powder; (2) dispersing the graphene powder in a solvent to form a suspension; and (3) separating magnetic impurities during stirring the suspension, by using magnet.

In step (3), the magnetic impurities could be removed, wherein the magnetic impurities were incorporated into the graphene powder during ball-milling from the balls and dispersed in the suspension.

The graphite material is in the form of a helix, and the ball-milling could be performed to make the graphene powder to be a size of 100 nm or smaller.

The solvent may be alcohol, acetone, DMF (dimethylformamide), or toluene.

Any one of the dispersing and the stirring may be performed by using ultrasonication, or both the dispersing and the stirring may be performed by using ultrasonication.

In order to obtain purer graphene powder, step (3) may be repeatedly performed on a remaining suspension from which magnetic impurities were separated, after performing step (3).

That's to say, namely, the first step (3) may be performed once to remove magnetic impurities primarily, and then, the suspension performed the first step (3) may be performed the second step (3) to improve the purity of graphene by removing magnetic impurities again.

Figure 1:
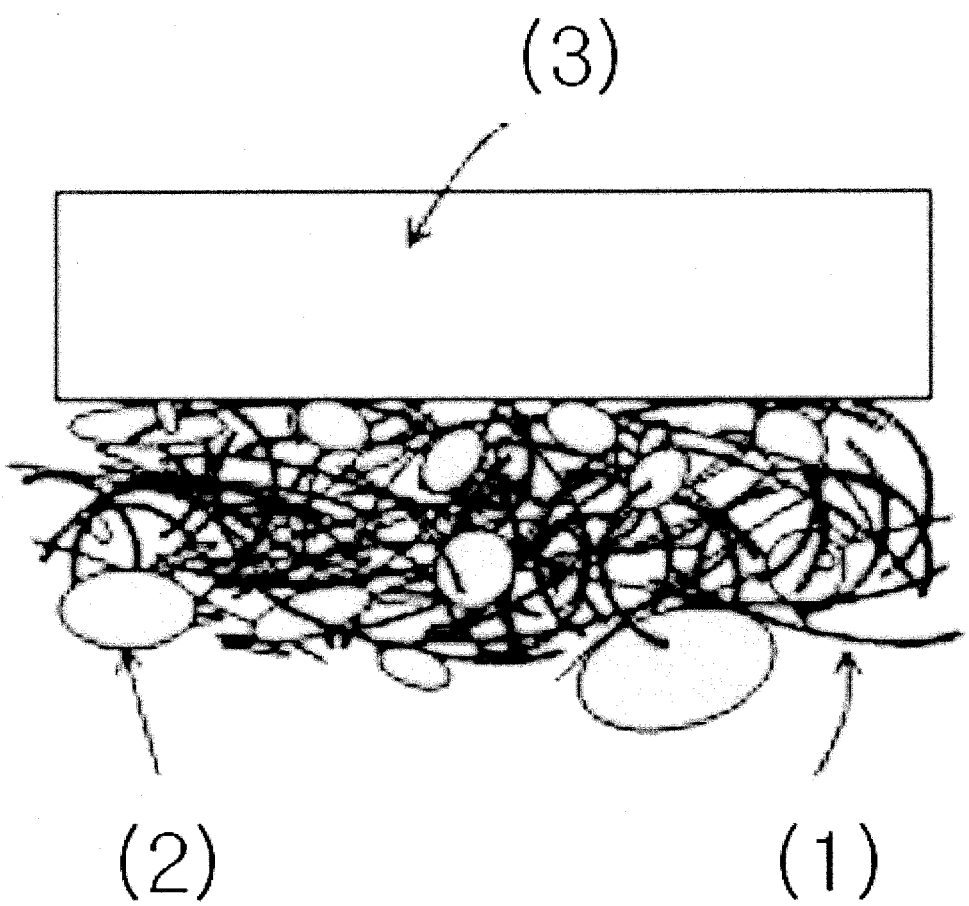
FIG. 1 is a schematic drawing to show a state in which the entirety of ball-milled graphene powder (1) swept to a magnet (3) along with magnetic impurities (2), indicating that the previous conventional method is not useful for purifying graphene powers fabricated by ball-milling.

FIG. 1 is a schematic drawing to show a state in which magnetic impurities (2) make ball-milled graphene powder (1) stick to a magnet (3). FIG. 1 indicates that it is impossible to remove magnetic impurities included in the graphene sample by the previous conventional method i.e., removing a magnetic impurity mixed in a sample in the form of a powder by using a magnet.

Figure 2:
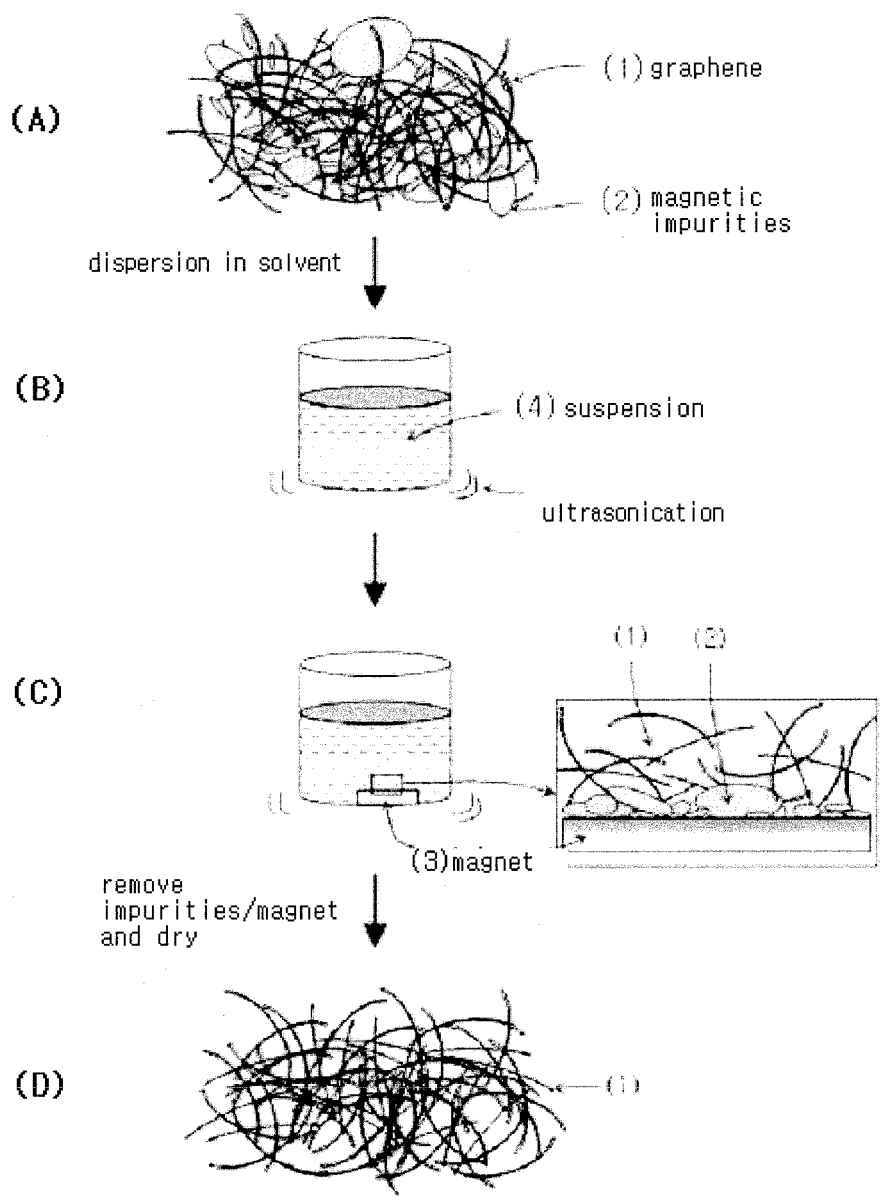
FIG. 2 is a schematic drawing to show each step of a method for purifying graphene powder according to an embodiment of the present invention.

FIG. 2 is a schematic drawing to show a procedure for purifying graphene powder fabricated by a mechanical method (typically ball-milling) according to an embodiment of the present invention.

Magnetic impurities, typically, iron-based impurities (2), can be incorporated into the graphene powder in the graphene sample (1) during the ball-milling process, and they are entangled (See FIG. 2(a)). In general, graphene powder fabricated by using the ball-milling method has a shape of a nano-ribbon having a thickness of 0.4 nm, a width of 5 nm or smaller, and a length of 100 nm or smaller. The size of impurities disposed in the sample is also very fine as 100 nm or smaller.

The graphene sample is dispersed in a solvent such as alcohol, acetone, DMF, or toluene with ultrasonication to create a suspension (4) (See FIG. 2(b)). A magnet (3) is put in the beaker and additional ultrasonication could be performed for a time (See FIG. 2(c)).

At this moment, the magnetic impurities which are incorporated into the graphene powder, stick to the magnet. As the magnet is took out from the suspension thereafter, pure graphene (1) remains in the beaker, i.e. in the purified suspension (4).

The suspension may be dried to obtain purified graphene powder (See FIG. 2(d)). Or, the purified graphene suspension may be used as it is, without a drying process.

In the foregoing process, graphene powder having a desired purity level can be obtained by adjusting the strength of a magnetic field of the magnet, the number of times of processing, and the like.

EXAMPLES

Hereinafter, the present invention will be described in detail through examples, but such examples are presented to help understand the present invention more clearly and the present invention is not limited thereto.

Example 1

1 g of a multi-walled tube-like graphite material (which has an average outer diameter of 20 nm or smaller, an average inner diameter of 5 nm or smaller, and a length of 2 μm to 3 μm) having a helical form of a graphene ribbon (which is a graphite material having a width of 5 nm or smaller and a thickness of 10 nm or smaller) was used as a raw material, and graphene nano-powder (or nano-ribbon) was fabricated by using a spex ball-milling apparatus.

A stainless ball being a diameter of 6 mm was used, and the ball milling was performed during two hours. After the ball milling, the weight of the test sample was 1.2 g, and when the ball-milled test sample was analyzed by X-ray, iron-based impurities were observed. It is confirmed that about 20 wt % of iron-based impurities were incorporated into the sample after the process of ball-milling.

Figure 3:
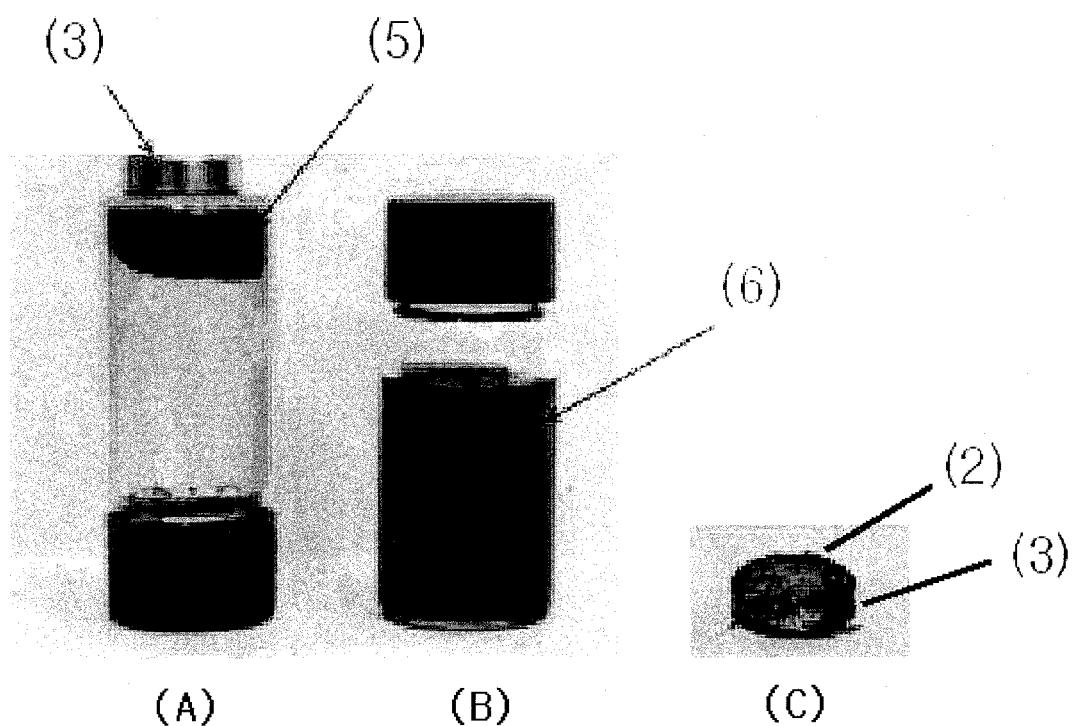
FIG. 3(a) is a photograph showing a state in which graphene fabricated through ball-milling and magnetic impurities (5) stick together with graphene to a magnet (3)
FIG. 3(b) is a photograph showing a state in which graphene powder purified according to an embodiment of the present invention is dispersed in alcohol (6)
FIG. 3(c) is a photograph showing a state in which magnetic impurities (2) separated upon using magnet (3) in the purifying process of an embodiment of the present invention.

FIG. 3(a) is a photograph showing a state in which graphene fabricated through ball-milling and magnetic impurities stick together to a magnet.

In Example 1, graphene stuck together with magnetic impurities to the magnet. When the magnet (having a diameter of 10 mm, a thickness of 5 mm, $(BH)_{Max}$ 4.0 MGOe) was close to the ball-milled powder sample, the mixture (5) of graphene and the magnetic impurities stuck to the magnet And in this case, the relatively light-weight graphene was swept to the magnetic impurities, which were finely or minutely dispersed overall, so as to stick to the magnet, and it is confirmed that it is not possible to effectively remove the iron-based (magnetic) impurities in the graphene powder sample through the conventional method (i.e., the method of separating and removing the magnetic impurities from the sample in the form of a powder at a dry condition by using a magnet).

With the observation by transmission electron microscope (TEM), it was confirmed that the graphene sample in the form of nano-powder (or nano-ribbon) with a thickness of 0.4 nm or smaller, a width of 5 nm or smaller, and a length of 20 nm or smaller coexisted with iron-based impurities having a size of tens of nm or smaller.

Example 2

The ball-milled graphene sample of Example 1 was purified as shown in FIG. 2. 0.5 g of the graphene sample was put in a 200-cc beaker and ultrasonicated for one minute to create a graphene suspension, and a magnet (having a diameter of 10 mm, a length of 100 mm, $(BH)_{Max}$ 4.0 MGOe) was put in the beaker and additionally ultrasonicated for five minutes.

When the magnet was taken out, about 0.1 g of impurities stuck to the magnet as shown in FIG. 3(c). The impurities were analyzed by X-ray, and it was confirmed that they were iron-based metal which is the same with that of the ball used.

When the purified graphene sample from which impurities were removed was analyzed by X-ray, no impurity was detected. The graphene sample has been suspended in alcohol for months, as shown in FIG. 3(b).

As the present invention may be embodied in several forms without departing from the characteristics thereof, it should also be understood that the above-described embodiments are not limited by any of the details of the is foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for purifying graphene powder, the method including:
   (1) ball-milling a graphite material by using a stainless ball to form graphene powder to be a size of 100 nm or smaller;
   (2) dispersing the graphene powder in a solvent to form a suspension; and
   (3) separating magnetic impurities during stirring the suspension, by using a magnet, wherein the magnetic impurities were incorporated into the graphene powder during ball-milling from the balls and dispersed in the suspension, and wherein the dispersing in step (2), the stirring in step (3), or the dispersing and the stirring in step (2) and step (3) is performed by using ultrasonication.

2. The method of claim 1, wherein the graphite material is in the form of a helix.

3. The method of claim 1, wherein the solvent is alcohol, acetone, DMF (dimethylformamide), or toluene.

4. The method of claim 1, wherein step (3) is performed repeatedly on a remaining suspension from which magnetic impurities were separated, after performing the step (3).

5. A method for purifying graphene powder, the method including:

(1) ball-milling a multi-walled tube-like graphite material having a helical form of a graphene ribbon to form graphene nano-powder by using a ball-milling apparatus with stainless balls with a diameter of 6 mm for two hours;

(2) dispersing the graphene nano-powder in a solvent to form a suspension;

(3) stirring the suspension, wherein magnetic impurities were incorporated into the graphene nano-powder during ball-milling from the balls and dispersed in the suspension;

(4) placing a magnet in the suspension, wherein the magnetic impurities stick to the magnet.

6. The method of claim 5, wherein the graphite material is in the form of a helix.

7. The method of claim 5, wherein the ball-milling is performed to make the graphene powder to be a size of 100 nm or smaller.

8. The method of claim 5, wherein the solvent is alcohol, acetone, DMF (dimethylformamide), or toluene.

9. The method of claim 5, wherein the dispersing in step (2), the stirring in step (3), or the dispersing and the stirring in step (2) and step (3) is performed by using ultrasonication.

* * * * *